(12) United States Patent
Watanabe et al.

(10) Patent No.: US 8,279,292 B2
(45) Date of Patent: Oct. 2, 2012

(54) IMAGE STABILIZATION CONTROL CIRCUIT

(75) Inventors: Tomofumi Watanabe, Gifu (JP); David Fumiaki Yamagata, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 224 days.

(21) Appl. No.: 12/684,155

(22) Filed: Jan. 8, 2010

(65) Prior Publication Data

US 2011/0043646 A1 Feb. 24, 2011

(30) Foreign Application Priority Data

Jan. 8, 2009 (JP) ................................. 2009-002284

(51) Int. Cl.
*H04N 5/228* (2006.01)
*H04N 5/217* (2011.01)
*G03B 17/00* (2006.01)
(52) U.S. Cl. ............. 348/208.7; 348/208.99; 348/208.2; 348/208.11; 348/222.1; 348/241; 396/52; 396/53; 396/55
(58) Field of Classification Search .................. 348/208.99–208.16, 222.1, 241; 396/52–55
See application file for complete search history.

(56) References Cited

U.S. PATENT DOCUMENTS

| 5,682,556 | A | * | 10/1997 | Iwane et al. | ..................... 396/55 |
| 6,078,751 | A | * | 6/2000 | Yamazaki et al. | ............... 396/55 |
| 6,208,810 | B1 | | 3/2001 | Imada | |
| 6,295,412 | B1 | * | 9/2001 | Katano et al. | .................... 396/55 |
| 6,734,901 | B1 | * | 5/2004 | Kudo et al. | ................. 348/208.4 |
| 2002/0112543 | A1 | * | 8/2002 | Noguchi | .......................... 73/618 |
| 2002/0163581 | A1 | * | 11/2002 | Kitazawa et al. | ........... 348/208.6 |
| 2003/0053803 | A1 | * | 3/2003 | Washisu | .......................... 396/55 |
| 2005/0128309 | A1 | * | 6/2005 | Tomita et al. | .............. 348/208.7 |
| 2006/0072912 | A1 | * | 4/2006 | Momochi et al. | ................ 396/55 |
| 2006/0165398 | A1 | * | 7/2006 | Imada | .............................. 396/55 |
| 2007/0077047 | A1 | * | 4/2007 | Nomura et al. | ................... 396/55 |
| 2007/0166021 | A1 | * | 7/2007 | Yamazaki | ........................ 396/55 |
| 2007/0183762 | A1 | * | 8/2007 | Washisu | .......................... 396/53 |
| 2008/0013936 | A1 | * | 1/2008 | Uenaka | ........................... 396/55 |
| 2008/0309772 | A1 | * | 12/2008 | Ikeda | .......................... 348/208.7 |
| 2009/0034950 | A1 | * | 2/2009 | Takagi et al. | .................... 396/55 |
| 2009/0154911 | A1 | * | 6/2009 | Shibata | ........................... 396/55 |
| 2009/0160958 | A1 | * | 6/2009 | Yamada et al. | ........... 348/208.99 |
| 2009/0160960 | A1 | * | 6/2009 | Nagata et al. | ............ 348/208.99 |
| 2009/0160962 | A1 | * | 6/2009 | Tabuchi et al. | ............ 348/208.99 |

FOREIGN PATENT DOCUMENTS

JP 10-213834 A 8/1998

* cited by examiner

*Primary Examiner* — Jason Chan
*Assistant Examiner* — Michael Osinski
(74) *Attorney, Agent, or Firm* — Cantor Colburn LLP

(57) ABSTRACT

The accuracy of servo control of a corrective lens in an image stabilization control circuit is prevented from decreasing due to non-linear characteristics of a position-detecting element. A signal representing a component of vibration of an image pickup apparatus is generated based on an angular velocity signal from a vibration-detecting element. A microcomputer corrects the vibration component signal according to a predetermined correction function and generates a target position signal representing a target position of the lens. A position-detection signal based on an output from the position-detecting element is compared with the target position signal, and the position of the lens is servo-controlled. The correction function is set so that the characteristics of variation of the target position signal relative to the target position will be the same as the characteristics of variation of the position-detection signal relative to the actual position of the lens.

1 Claim, 4 Drawing Sheets

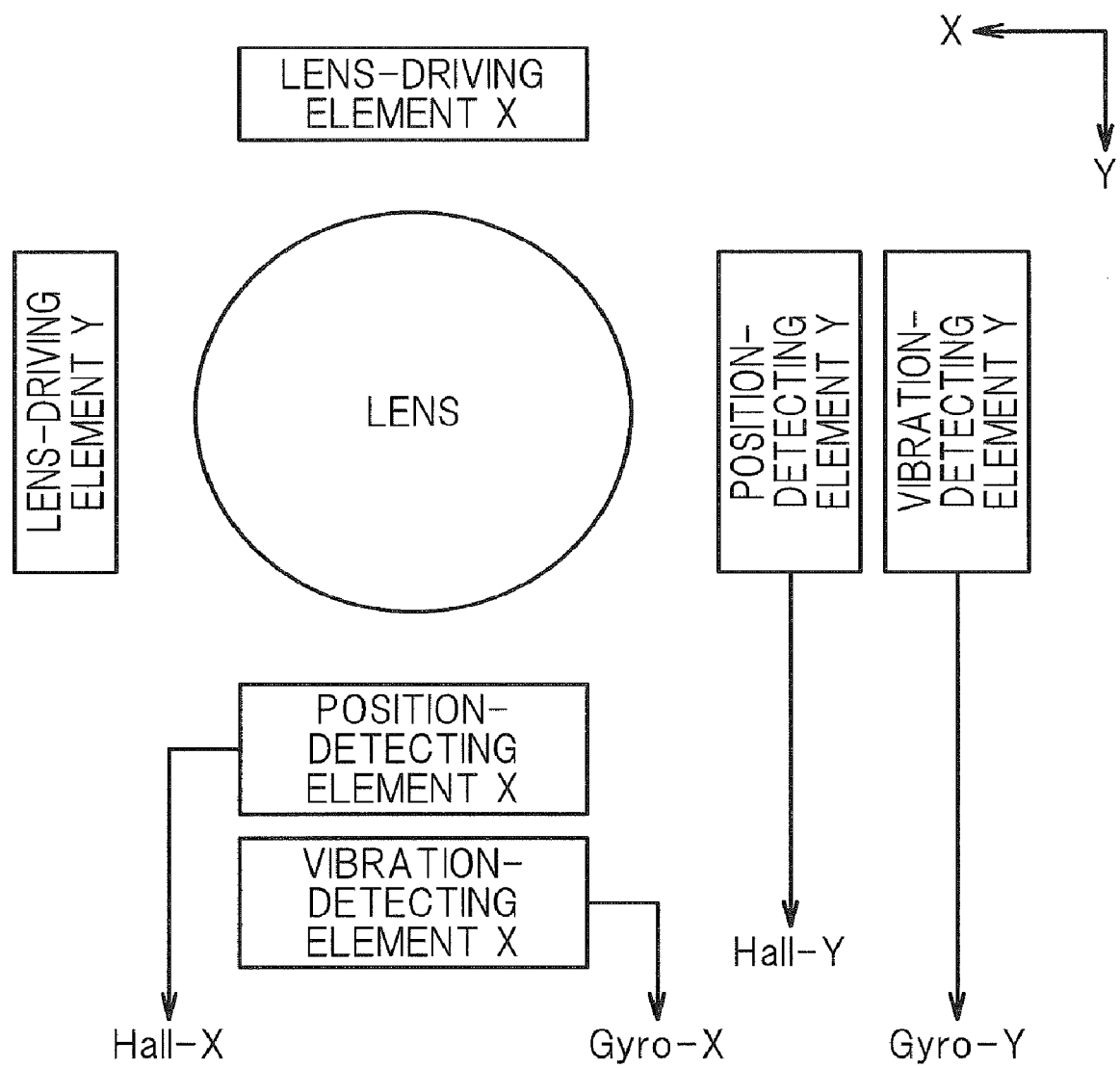

DISTANCE FROM REFERENCE POSITION

DISTANCE FROM REFERENCE POSITION

PRIOR ART

IMAGE STABILIZATION CONTROL CIRCUIT

CROSS-REFERENCE TO RELATED APPLICATION

The present application claims priority from Japanese application JP 2009-002284 filed on Jan. 8, 2009, the content of which is hereby incorporated by reference into this application.

BACKGROUND OF THE INVENTION

1. Field of the Invention

The present invention relates to an image stabilization control circuit used for an image pickup apparatus.

2. Description of the Related Art

In recent years, the quality of images handled by image pickup apparatuses such as digital still cameras and digital video cameras has been enhanced by increasing the number of pixels handled by an imaging element installed in the device. Another desired method for enhancing the quality of images captured by image pickup apparatuses involves providing the image pickup apparatuses with a hand-shake correction function in order to prevent blurring of a target image due to vibration generated when the hand(s) holding the image pickup apparatus shake or for other reasons.

Specifically, the image pickup apparatus comprises a vibration-detecting element such as a gyro-sensor. The device drives moveable components such as a corrective lens or an imaging element, according to an angular velocity component generated by vibration of the image pickup apparatus; and prevents the image from blurring. A high-quality image signal with no blurring can thereby be obtained without the vibration component reflected in the resulting imaging signal, even if the image pickup apparatus vibrates.

FIG. 4 is a block diagram of a conventional image stabilization control circuit 100 for obtaining a hand-shake correction function. The image stabilization control circuit 100 is provided to an image pickup apparatus, and is operated under the control of a main control circuit (not shown) provided to the image pickup apparatus. The image stabilization control circuit 100 is connected to a position-detecting element 102, a lens-driving element 104, and a vibration-detecting element 106.

The position-detecting element 102 detects the position of a corrective lens (lens 108) that constitutes a part of an optical system of the image pickup apparatus. The position-detecting element 102, which may be a Hall element, generates an induced current according to the absolute position of the lens 108, and outputs a voltage signal. The lens-driving element 104 may be a voice coil motor. The image stabilization control circuit 100 adjusts the magnitude of a voltage applied to the lens-driving element 104 and thereby controls the position of a moveable coil in the voice coil motor; i.e., the position of the lens 108. The lens-driving element 104 drives the lens 108 within a plane (x-y plane) perpendicular to an optical axis of the image pickup apparatus. The vibration-detecting element 106 detects vibration of the image pickup apparatus and outputs the result to the image stabilization control circuit 100. The vibration-detecting element 106 may be a gyro-sensor. The vibration-detecting element 106 generates an angular velocity signal corresponding to the vibration imparted to the image pickup apparatus, and outputs the signal to the image stabilization control circuit 100.

Each of the position-detecting element 102, the lens-driving element 104, and the vibration-detecting element 106 preferably comprises at least two elements. For example, a plurality of elements are provided so as to correspond to the direction of each of the x-axis and the y-axis, the elements detecting the position of the lens 108, moving the lens 108, and detecting vibration of the image pickup apparatus.

The image stabilization control circuit 100 will now be described in detail. The image stabilization control circuit 100 has a servo circuit 10, a lens driver 12, an analog-digital converter circuit (ADC) 14, a central processing unit (CPU) 16, and a digital-analog converter circuit (DAC) 18.

The servo circuit 10 generates a signal for controlling the lens-driving element 104 according to a voltage signal outputted by the position-detecting element 102. The servo circuit 10 has an analog filter circuit having an external resistor, capacitor, or another component; and generates a signal for controlling the lens-driving element 104 so as to counteract a displacement in an image caused by tilting of an optical axis of the lens of the image pickup apparatus. Based on the signal generated by the servo circuit 10, the lens driver 12 generates a lens-driving signal for driving the lens-driving element 104.

The ADC 14 converts the analog angular velocity signal outputted by the vibration-detecting element 106 into a digital signal. Based on the digital angular velocity signal, the CPU 16 generates an angle signal indicating the degree of displacement of the image pickup apparatus. The CPU 16 is connected to a memory device (not shown), the CPU 16 generating the angular signal based on software stored in the memory device. The DAC 18 converts the digital angle signal generated by the CPU 16 into an analog signal.

The servo circuit 10 generates a lens-driving signal for driving the lens-driving element 104 according to a signal that is a sum of the analog angle signal outputted by the DAC 18 and the voltage signal outputted by the position-detecting element 102. Specifically, in order to prevent hand-shake-derived blur, the position of the lens is altered based on the angle signal indicating the degree of displacement of the image pickup apparatus, and blurring of the target image on the imaging element is prevented. Hand-shake-derived blur of the target image is thereby minimized, and a high-quality image signal can be obtained.

SUMMARY OF THE INVENTION

It is desirable to substitute the servo circuit, the lens driver, and the circuit for processing the vibration-detection signal with a logic circuit that is capable of digital processing, in order to improve the processing speed of the image stabilization control circuit. Also, even in an instance where the logic circuit is used, the image stabilization control circuit must be made as small as possible because the image stabilization control circuit will be installed in an image pickup apparatus such as a digital camera or a lens module of an image pickup apparatus.

The signal outputted by a position-detecting element used for detecting the position of a moveable component such as a lens is preferably of a magnitude proportional to the degree of displacement from a reference position. However, any error related to the characteristics or installation position of the position-detecting element itself may prevent the magnitude of the signal from being proportional to the degree of displacement from a reference position, as shown in FIG. 5. A problem is presented when a moveable component is driven towards a target position generated based on a signal outputted by a vibration-detecting element, inasmuch as the displacement of the moveable component will not be of the inherently required value if, e.g., the driving control signal is generated based on the assumption that the position-detecting element has a linear characteristic.

To resolve the problem described above, it is necessary for the image stabilization control circuit to perform a correction process relating to the non-linearity of input/output characteristics of the position-detecting element. However, the characteristics of each of the position-detecting elements are inconsistent from one element to another, and it is therefore difficult to configure a corrective circuit within the image stabilization control circuit with fixed logic circuitry.

The present invention provides an image stabilization control circuit for resolving the above-mentioned problem.

The image stabilization control circuit according to the present invention is used for an image pickup apparatus comprising a vibration-detecting element, a vibration-compensating mechanism having a moveable component, and a position-detecting element for detecting a driving position of the moveable component, the displacement of the moveable component reducing the effect of image-capture displacement resulting from vibration of the image pickup apparatus; wherein the image stabilization control circuit comprises: a current position signal-generating part for generating a current position signal for indicating a current position of the moveable part, based on a signal outputted by the position-detecting element; a shake displacement signal-generating part for generating a shake displacement signal in accordance with the degree of shake displacement of the image pickup apparatus, based on a signal outputted by the vibration-detecting element; a target position signal-generating part for correcting the shake displacement signal based on a pre-set correction function and generating a target position signal for indicating a target position for the moveable component; and a displacement control signal-generating part for generating a displacement control signal for instructing the vibration-compensating mechanism to displace the moveable component from the current position to the target position, based on the target position signal and the current position signal; the target position signal-generating part comprises: a memory part for storing, as the correction function, a corresponding relationship between the shake displacement signal and the target position signal configured based on a relationship between the driving position of the moveable component and the current position signal; and a processor for calculating the target position signal from the shake displacement signal, based on the correction function.

BRIEF DESCRIPTION OF THE DRAWINGS

FIG. 2 is a drawing showing a relative layout of vibration-detecting elements and position-detecting elements according to the embodiment of the present invention;

DESCRIPTION OF THE PREFERRED EMBODIMENTS

An embodiment of the present invention ("the embodiment" hereafter) will now be described with reference to the accompanying drawings.

Figure 1:
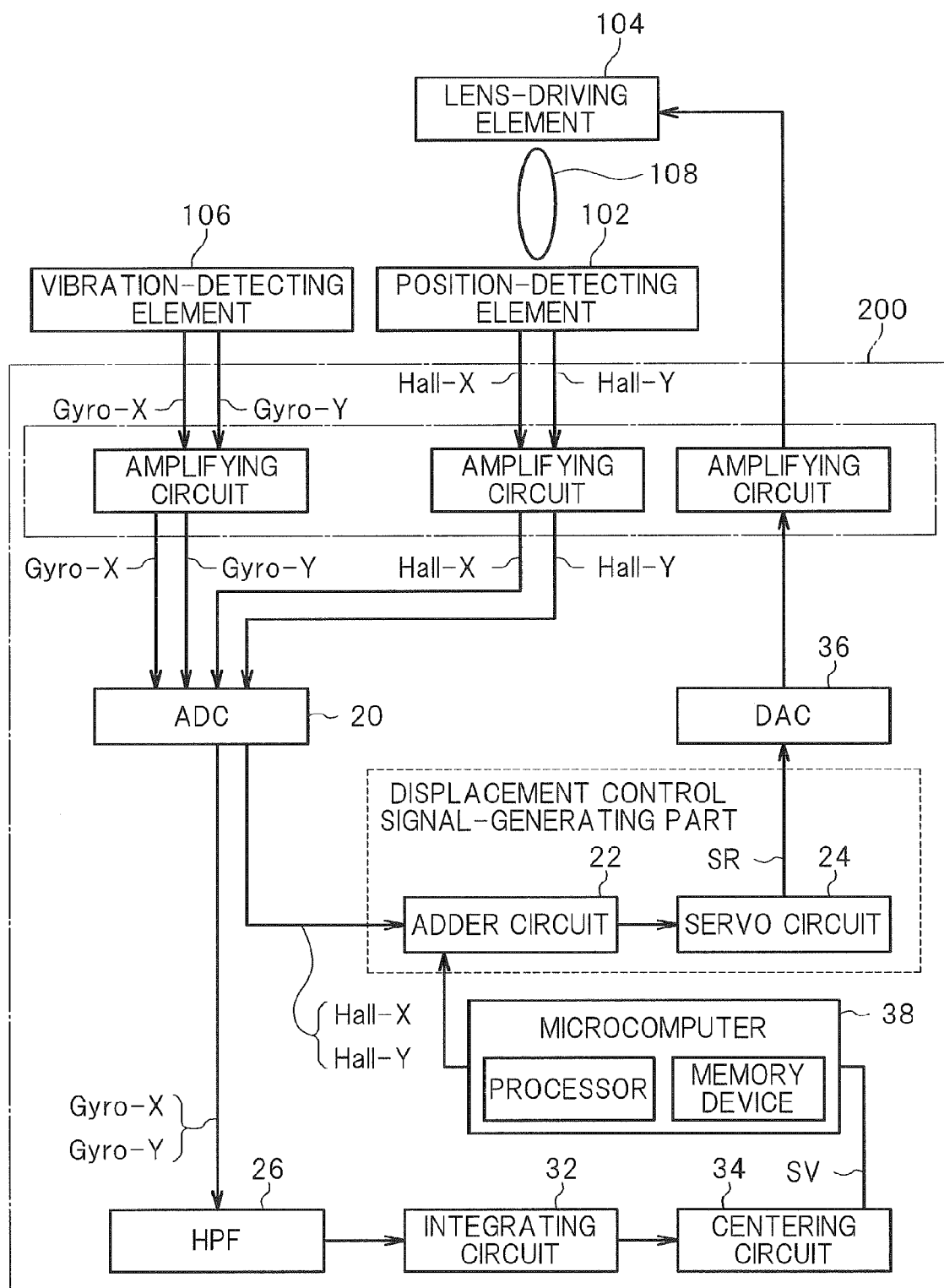
FIG. 1 shows a configuration of an image stabilization control circuit that is an embodiment of the present invention.

An image stabilization control circuit 200 that is an embodiment of the present invention comprises an ADC 20, an adder circuit 22, a servo circuit 24, a high-pass filter (HPF) 26, an integrating circuit 32, a centering circuit 34, a DAC 36, and a microcomputer 38, as shown in a function block diagram shown in FIG. 1.

The image stabilization control circuit 200 is connected to a position-detecting element 102, a lens-driving element 104, and a vibration-detecting element 106. The elements are similar to those described in the prior art. Specifically, the position-detecting element 102 is provided in relation to two or more axes in order to measure the position, within at least an x-y plane, of the lens 108 driven by the lens-driving element 104. The vibration-detecting element 106 is also provided in relation to two or more axes in order to detect a vibration component in each of yaw and pitch directions.

The direction in which the image shifts as a result of a yawing movement of the image pickup apparatus is defined as the x-axis, and the direction in which the image shifts as a result of a pitching movement is defined as the y-axis. According to the present embodiment, the position-detecting elements 102 include one for detecting the lens position in the x-axis direction and one for detecting the lens position in the y-axis direction, and the vibration-detecting elements 106 include one for detecting vibration in the x-axis direction and one for detecting vibration in the y-axis direction. The signals outputted by each of the position-detecting element 102 and the vibration-detecting element 106 are added or otherwise processed, with x-component signals being added or otherwise processed separately from y-component signals. The x-coordinate of the lens is controlled based on the result of processing the x-components, and the y-coordinate of the lens is controlled based on the result of processing the y-components.

The ADC 20 converts an analog voltage signal outputted by the position-detecting element 102; e.g., a Hall element, into a digital signal. The Hall element generates an induced current corresponding to a magnetic force resulting from a magnet fixed to the lens 108. Specifically, the Hall element outputs a voltage signal indicating the position of the lens 108 according to the distance between the element and the lens 108, and the ADC 20 converts the voltage signal to a digital signal and outputs it as a position signal. The ADC 20 outputs a signal indicating a reference position, such as a digital value indicating "0" when the optical axis of the lens 108 is in alignment with the optical axis of the entire optical system and with the center of the imaging element provided to the image pickup apparatus.

The ADC 20 additionally converts an analog angular velocity signal outputted by the vibration-detecting element 106; e.g., a gyro-sensor, into a digital signal. Specifically, the ADC 20 converts the signal outputted by the position-detecting element 102 and the vibration-detecting element 106 into a digital signal using time-division and outputs the digital signal. Thus, the ADC generates a current position signal showing the current position of the lens 108 based on the signal outputted by the position-detecting element 102, and also generates a shake displacement signal corresponding to the degree of shake displacement of the image pickup apparatus based on the signal outputted by the vibration-detecting element 106.

Specifically, as shown in FIG. 2, the ADC 20 digitizes and outputs each of the following signals in the stated sequence: a signal for the x-axis component of the vibration detected by the vibration-detecting element 106 (Gyro-x), a signal for the x-axis component of the position of the lens 108 detected by the position-detecting element 102 (Hall-x), a signal for the y-axis component of the vibration detected by the vibration-detecting element 106 (Gyro-y), and a signal for the y-axis component of the position of the lens 108 detected by the position-detecting element 102 (Hall-y).

The HPF 26 removes the DC component in the angular velocity signal outputted by the vibration-detecting element 106, and extracts the high-frequency component of the angular velocity signal, which corresponds to the vibration of the image pickup apparatus.

The integrating circuit 32 integrates the angular velocity signal outputted from the HPF 26 and generates an angle signal (shake displacement signal) indicating the degree of displacement of the image pickup apparatus. The integrating circuit 32 preferably has a digital filter (not shown), and performs filtering according to a filtering coefficient recorded in a register (not shown), whereby an angle signal; i.e., the degree of displacement of the image pickup apparatus, is determined.

The centering circuit 34 subtracts a predetermined magnitude from the angle signal outputted by the integrating circuit 32, and generates a vibration component signal (SV-x, SV-y) indicating the degree of displacement of the image pickup apparatus. In cases where hand-shake correction is performed on the image pickup apparatus, the position of the lens may gradually move away from the reference position with repeated correction and approach the point of limitation of lens movability. If hand-shake correction continues to be performed in such circumstances, the lens will be able to move in one direction, but will be unable to move in the other direction. The centering circuit 34, which is provided to prevent such circumstances from occurring, subtracts the predetermined magnitude from the angle signal and thereby controls the lens so as to reduce the likelihood of its approaching the point of limitation of movability.

The centering circuit 34 preferably has a digital filter (not shown), and performs filtering according to a filtering coefficient recorded in a register (not shown), thereby subtracting the predetermined magnitude from the angle signal.

The microcomputer 38 has a processor and a memory device. The microcomputer 38 receives the vibration component signal (SV-x, SV-y) from the centering circuit 34 and corrects the signal. A correction function for correcting the characteristics of the vibration component signal (SV-x, SV-y) to correspond to the non-linear input/output characteristics of the position-detecting element 102 is stored in advance in an internal memory device in the microcomputer 38. The microcomputer 38 corrects the magnitude of each of the inputted x-axis vibration component signal (SV-x) and the y-axis vibration component signal (SV-y) using the correction function, and generates a target position signal indicating the target position of the lens 108 based on the corrected vibration component signal. The target position signal is inputted into the adder circuit 22.

Figure 3A:
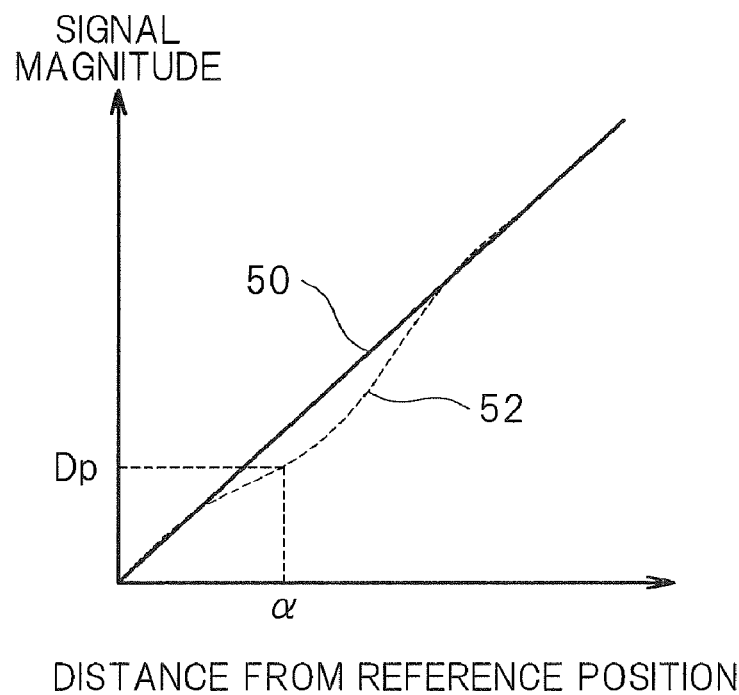
FIGS. 3a and 3b illustrate a correction process performed on a vibration component signal according to the embodiment of the present invention.
Figure 3B:
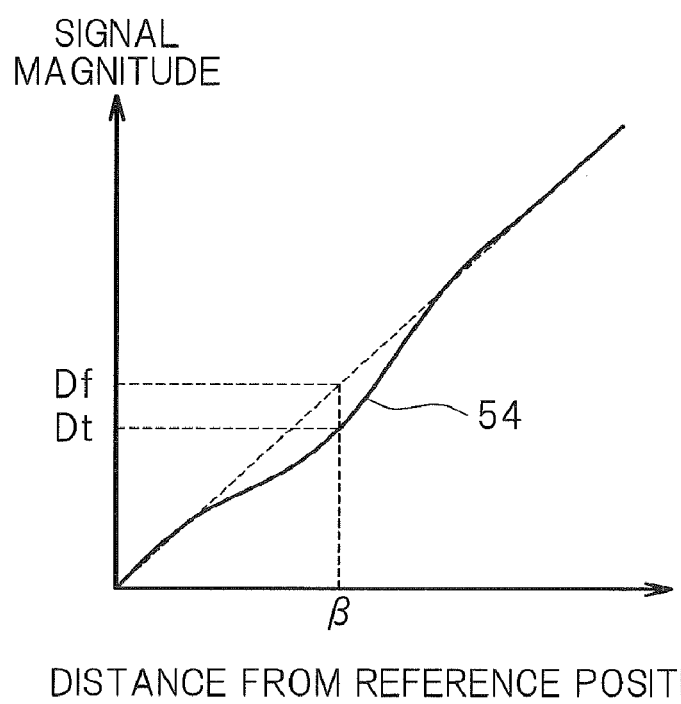
Figure 4:
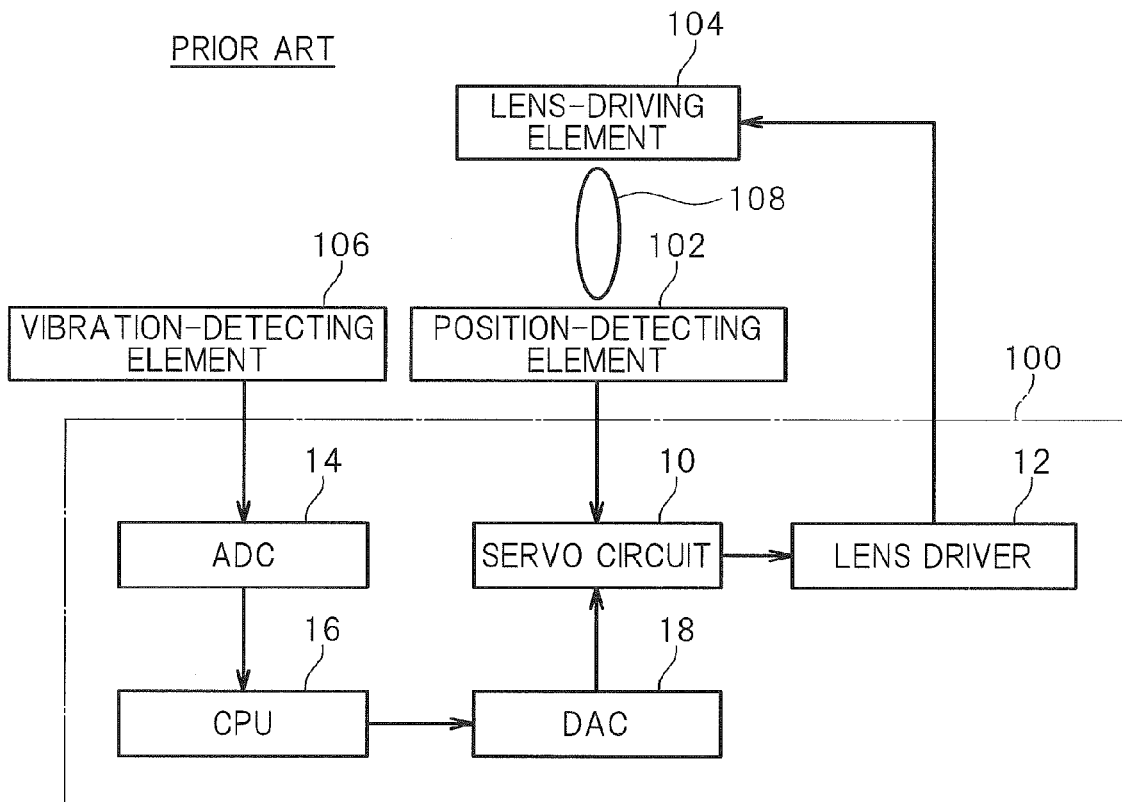
FIG. 4 shows a configuration of a conventional image stabilization control circuit.
Figure 5:
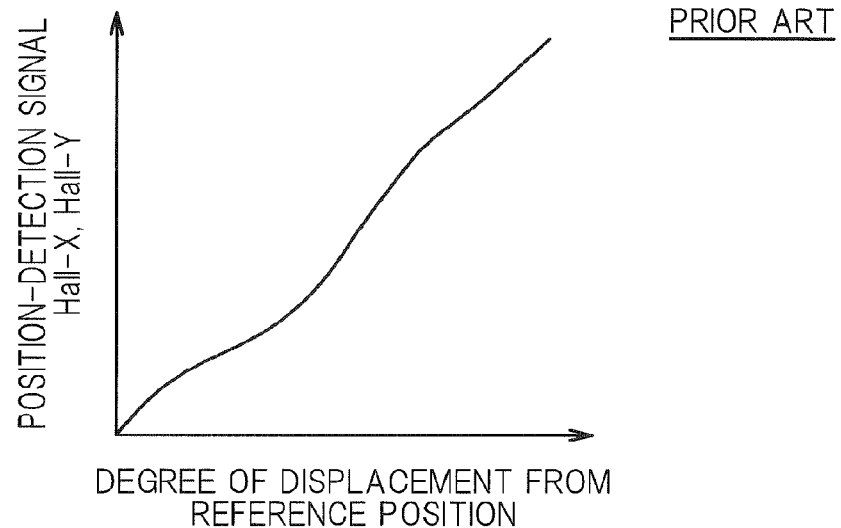
FIG. 5 shows a signal outputted by a position-detecting element.

FIGS. 3a and 3b indicate a correction process performed on the vibration component signal corresponding to the shake displacement signal. In FIGS. 3a and 3b, the horizontal axis represents the distance from the reference position, wherein the distance represents the position of the lens 108 in real space. The vertical axis represents the magnitude of a digital signal representing the position of the lens 108. The relationship between the target position signal based on the vibration component signal (SV-x, SV-y) before correction and the degree of displacement of the lens 108 required to compensate for blurring of the captured image caused by the vibration is represented by, for example, a dotted straight line in FIG. 3b. This dotted straight line in FIG. 3b corresponds to the straight line 50 in FIG. 3a. In contrast, input/output characteristics of the position-detecting element 102 showing the relationship between the position of the lens 108 and the magnitude of a position-detection signal (Hall-x, Hall-y) do not necessarily coincide with the straight line 50. An example of such input/output characteristics is shown in FIG. 3a as a curve 52. The curve 52 has a portion in which the magnitude of the signal outputted by the position-detecting element 102 is not proportional to the distance from the reference position.

After correction, the relationship between the target position signal based on the vibration component signal (SV-x, SV-y) after correction; i.e., the target position signal, and the target position of the lens 108 is represented by a solid curve 54, as shown in FIG. 3b. The curve 54 corresponds to the correction function. β represents the target position of the lens 108 displaced according to displacement of the image pickup apparatus. When the lens 108 is displaced from current position α to the target position β, displacement of the captured image resulting from displacement of the image pickup apparatus is compensated.

The correction function defines a corresponding relationship between the magnitude of the shake displacement signal before correction and the magnitude of the shake displacement signal after correction, based on the relationship between position a of the lens 108 and magnitude Dp of the position-detection signal, and corresponds to a corresponding relationship between the magnitude Df of the target position signal base on the vibration component signal before correction and the magnitude Dt of the target position signal base on the vibration component signal after correction. Specifically, the curve 54 that represents the correction function has a characteristic that coincides with, or is an approximation of, the curve 52 showing the magnitude of the position-detection signal corresponding to the position of the lens. The curve 54 is stored as the correction function in the memory device of the microcomputer 38.

During correction, magnitude Df of the target position signal corresponding to the target position β of the lens 108 is converted into magnitude Dt of the target position signal using the correction function. If Dp is the magnitude of the position-detection signal corresponding to the current position a of the lens 108, then setting the curve 54 to basically coincide with the curve 52 will result in a being equal to β if Dp equals Dt. Specifically, a control is performed so that the magnitude Dp approaches the magnitude Dt of the target position signal generated by correction performed using the correction function, whereby the lens 108 can be suitably moved to the target position.

The correction function is set according to the characteristics of each of the individual position-detecting elements 102. Specifically, a correction function may be set separately for each of the image pickup apparatus; i.e., each of the image stabilization control circuits 200. In the present embodiment, a correction function is set for each of the position-detecting element 102 in the x-axis and the position-detecting element 102 in the y-axis.

The input-output characteristics of the Hall element used as the position-detecting element 102 are measured, whereupon the correction function is set according to the input/output characteristics and stored in advance in the internal memory within the microcomputer 38. The correction function may be defined by an arithmetic expression or by a table storing an output magnitude corresponding to each input magnitude. Broken line approximation is an example of a method that can be used for expressing an approximation of the curve 52.

The adder circuit 22 adds, in each of the x- and y-axis directions, the position-detection signal to the target position signal outputted by the microcomputer 38, and outputs the resulting signal to the servo circuit 24.

The servo circuit 24 generates, in accordance with the signal outputted by the adder circuit 22, a correction signal (displacement control signal) SR for controlling driving of the lens-driving element 104. The servo circuit 24 has a register and a digital filter circuit, and performs filtering using a filter coefficient stored in the register.

In the present embodiment, the adder circuit 22 and the servo circuit 24 constitute a displacement control signal-generating part for generating a displacement control signal for instructing the lens-driving element 104, which is a vibration-compensating mechanism, to displace the lens 108 from the current position to the target position, based on the target position signal and the current position signal.

The DAC 36 converts the digital correction signal SR to an analog signal. The lens-driving element 104 drives the lens 108 of the image pickup apparatus along each of the x-axis and the y-axis, based on the correction signal SR that had been converted to analog by the DAC 36.

The microcomputer 38 is not necessarily used solely to perform the correction, and may also be used for another process. For example, a CPU for performing a variety of controls on the image pickup apparatus may be used to perform the correction.

A description shall now be provided of a process for using the image stabilization control circuit 200 shown in FIG. 1 to control the movement of the lens in order to correct hand-shake-derived blur of the target image. It shall be assumed that the image pickup apparatus is configured so that the lens 108 is displaced in a direction that results in an increase in the magnitude Dp of the position-detection signal in response to a hand-shake in a direction that results in an increase in the magnitude Dt of the target position signal, thereby making it possible to reduce the effect of the hand-shake. In such a configuration, the adder circuit 22 determines its output Ds obtained using the equation Ds=Dt−Dp, and the servo circuit 24 generates the correction signal SR for instructing the lens-driving element 104 so that the output Ds of the adder circuit 22 approaches zero.

For example, when the lens 108 is in the reference position, the magnitude of Dp is zero. When the image pickup apparatus is not subject to hand-shake, the output of the vibration-detecting element 106 is zero; therefore, the shake displacement is also zero, and the magnitude Dt of the target position signal outputted by the microcomputer 38 is also zero. Specifically, in such an instance where the lens 108 is in the reference position and the image pickup apparatus is not subject to hand-shake, output Ds of the adder circuit 22 is zero because Dp−Dt=0. As a result, the servo circuit 24 outputs a correction signal SR for controlling the lens-driving element 104 so as to maintain the current position of the lens 108.

In an instance where the lens 108 is displaced from the reference position, and the image pickup apparatus is not subject to hand-shake, Dp≠0, while Dt=0. In such an instance, the servo circuit 24 generates a correction signal SR and outputs it to the lens-driving element 104 so that Dp becomes zero. The operation is repeated each time the position is periodically detected, and the lens 108 is thereby moved to the reference position.

In an instance where the lens 108 is in the reference position and the image pickup apparatus is subject to hand-shake, Dp=0 while Dt≠0. In such an instance, the servo circuit 24 generates a correction signal SR each time the position is periodically detected, so that the value of Dp approaches that of Dt. As a result, the lens 108 is moved to a position corresponding to magnitude Dt of the target position signal. The same applies when the lens 108 is displaced from the reference position. When Dt≠Dp, the servo circuit 24 generates a correction signal SR each time the position is periodically detected, so that the value of Dp approaches that of Dt.

Since each of Dp and Dt has a non-linear characteristic as shown by curve 52 in FIG. 3a and curve 54 in FIG. 3b, the magnitude Dp of the position-detection signal is not proportional to the current position of the lens 108, and the magnitude Dt of the target position signal is not proportional to the target position. However, as mentioned above, performing a control so that the value of Dp approaches that of Dt makes it possible to move the lens 108 towards the target position; the fact that the characteristics yielded by each of the curves 52, 54 are non-linear has no effect on the lens 108 reaching the target position.

According to the embodiment of the present invention as described above, a microcomputer 38 is used to correct the vibration component signal with respect to the difference between the input/output characteristics 52 of the position-detecting element 102 and the characteristics of the vibration component signal. It is thereby possible to control vibration with a high degree of accuracy.

The position-detecting element 102 has characteristics that are inconsistent between element types as well as between elements; it is therefore difficult to use logic circuitry as a corrective circuit relating to such characteristics. In response, the image stabilization control circuit 200 has firmware stored internally in the microcomputer 38 to address the inconsistencies in the characteristics of the position-detecting element 102. This makes the image stabilization control circuit 200 more suitable than a corrective circuit comprising logic circuitry in terms of performing a correction corresponding to the characteristics of the position-detecting element 102.

The signal outputted by each of the position-detecting element 102 and the vibration-detecting element 106 may be converted by the ADC 20 into digital data using a relatively high common sampling rate; however, data based on the signal outputted by the vibration-detecting element 106 is downsampled using a process performed by the digital filter for generating the vibration component signal (i.e., the HPF 26 to the centering circuit 34). Therefore, compared to the process of correcting data representing the position-detection signal, data with a lower data rate is processed when data representing the vibration component signal is corrected, and the processing load on the microcomputer 38 is alleviated.

In the embodiment of the present invention, a Hall element, a voice coil motor, and a gyro-sensor is used for the position-detecting element 102, the lens-driving element 104, and the vibration-detecting element 106, respectively. However, these components are not provided by way of limitation to the invention. For example, a piezoelectric element may be used for the lens-driving element 104. The vibration-detecting element 106 may be one that detects the vibration of the image pickup apparatus based on an acceleration signal, using a sensor for detecting linear acceleration.

According to the embodiment of the present invention, furthermore, a lens-shift method, in which a lens is moved and hand-shake correction is performed, is used; however, this method is not provided by way of limitation to the present invention. For example, the present invention may be applied to a CCD shift method, in which an imaging element such as a CCD image sensor is shifted according to a displacement of the image pickup apparatus. In such an instance, the position-detecting element 102 may be an element for detecting the position of the imaging element, and the lens-driving element 104 may be an element for driving the imaging element.

According to the present invention, a processor is used to perform the correction process in accordance with non-linearity in the input/output characteristics of the position-detecting element; therefore, even when there are inconsistencies in the characteristics of the position-detecting element, parameters and programs stored in the memory device can be rewritten, thereby allowing the correction process to be suitably performed.

In hand-shake correction systems, a relatively short period must be used to sample the position of a moveable component in order to prevent oscillation and improve the correction performance; however, the period for determining the target position according to the signal outputted by a vibration-detecting element may be longer. According to the present invention, a target position signal is not corrected so as to match the linear characteristics of the vibration-detecting element represented by a dotted straight line in FIG. 3B that provides the target position signal with magnitude. Instead, the signal outputted by the vibration-detecting element is corrected so as to match potentially non-linear input/output characteristics of the position-detecting element (curve 54), whereby a target position signal with magnitude Dt in FIG. 3B is generated. Such a configuration has the effect of providing sufficient time for repeating the correction process, reducing the processing load on the processor, and making it possible to use a processor with a low processing speed and thereby reduce cost.

What is claimed is:

1. An image stabilization control circuit used for an image pickup apparatus comprising
   a vibration-detecting element,
   a vibration-compensating mechanism having a moveable component, and
   a position-detecting element for detecting a driving position of the moveable component, displacement of the moveable component reducing the effect of image-capture displacement resulting from vibration of the image pickup apparatus; wherein the image stabilization control circuit comprises:
   a current position signal-generating part for generating a current position signal, which is a digital signal, for indicating a current position of the moveable part, based on a signal outputted by the position-detecting element;
   a shake displacement signal-generating part for generating a shake displacement signal, which is a digital signal, in accordance with a degree of shake displacement of the image pickup apparatus, based on a signal outputted by the vibration-detecting element, using a sampling rate lower than the current position signal;
   a target position signal-generating part for correcting the shake displacement signal based on a pre-set correction function and generating a target position signal for indicating a target position for the moveable component; and
   a displacement control signal-generating part for generating a displacement control signal for instructing the vibration-compensating mechanism to displace the moveable component from the current position to the target position, based on the target position signal and the current position signal;

the target position signal-generating part comprises:
   a memory part for storing, as the correction function, a corresponding relationship between a value before a correction and a corrected value of the shake displacement signal configured based on input/output characteristics of the position-detecting element indicating a relationship between the driving position of the moveable component and the current position signal; and
   a processor for correcting the shake displacement signal and calculating the target position signal from the corrected shake displacement signal, based on the correction function.

* * * * *